(12) United States Patent
Chen et al.

(10) Patent No.: US 10,352,690 B2
(45) Date of Patent: Jul. 16, 2019

(54) MEASURING APPARATUS (71) Applicant: INDUSTRIAL TECHNOLOGY RESEARCH INSTITUTE, Hsinchu (TW)

(72) Inventors: Chien-Wen Chen, Zhubei (TW); Mao-Sheng Huang, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/845,976

(22) Filed: Dec. 18, 2017

(65) Prior Publication Data

US 2019/0186900 A1 Jun. 20, 2019

(51) Int. Cl.
*G01B 11/24* (2006.01)
*G01B 11/10* (2006.01)
(Continued)

(52) U.S. Cl.
CPC ............ *G01B 11/24* (2013.01); *G01B 9/0205* (2013.01); *G01B 21/047* (2013.01)

(58) Field of Classification Search
CPC . B61K 9/08; B61K 9/12; G01B 11/14; G01B 11/25; G01B 11/306; G01B 11/105;
(Continued)

(56) References Cited

U.S. PATENT DOCUMENTS 3,864,039 A * 2/1975 Wilmarth ................. B61K 9/08
33/287
4,198,164 A * 4/1980 Cantor ..................... B61K 9/08
250/202
(Continued)

FOREIGN PATENT DOCUMENTS

CN 102057269 A 5/2011
CN 101657388 B 11/2012
(Continued)

OTHER PUBLICATIONS

Pawel Majda, "Modeling of geometric errors of linear guideway and their influence on joint kinematic error in machine tools", Precision Engineering 36, (Feb. 4, 2012), 369-378.
(Continued)

*Primary Examiner* — Sang H Nguyen
(74) *Attorney, Agent, or Firm* — Maschoff Brennan (57) ABSTRACT

A measuring apparatus for measuring surface topography of the slides to be measured of a guide rail is provided. The measuring apparatus includes a plurality of detecting probe and at least one moving device. The detecting probes are mounted on a probe support according to the surface topography of the slides to be measured. The moving device shifts the probe support or the slides to be measured on the cross section of the guide rail so that the detecting probe has a displacement relative to the slides to be measured. Each of the detecting probes has a corresponding coordinate system, and the corresponding coordinate system is different from each other. A standard part is utilized to correct deviations among the corresponding coordinate systems to the same coordinate system, and then the same coordinate system as a benchmark to measure the surface topography of the slides to be measured.

5 Claims, 9 Drawing Sheets

(51) Int. Cl.
*G01B 11/08* (2006.01)
*G01B 21/04* (2006.01)
*G01B 9/02* (2006.01)

(58) Field of Classification Search
CPC .... G01B 11/245; B61L 23/047; B61L 23/048; B61L 23/045; G01N 21/8901; G01C 3/08; G06T 7/0006
See application file for complete search history.

(56) References Cited

U.S. PATENT DOCUMENTS

| | | | | |
|---|---|---|---|---|
| 4,259,018 | A * | 3/1981 | Poirier | G01B 11/14 356/3.06 |
| 4,531,837 | A * | 7/1985 | Panetti | G01B 11/2518 356/394 |
| 4,579,454 | A | 4/1986 | Kleinknecht | |
| 4,866,642 | A * | 9/1989 | Obrig | G01B 11/08 702/157 |
| 4,915,504 | A * | 4/1990 | Thurston | B61L 23/045 356/604 |
| 5,793,492 | A * | 8/1998 | Vanaki | G01B 11/245 356/608 |
| 6,556,945 | B1 * | 4/2003 | Burggraf | B61L 23/045 356/606 |
| 6,833,554 | B2 * | 12/2004 | Wooh | G01N 29/041 250/559.42 |
| 6,895,682 | B2 | 5/2005 | Sohn et al. | |
| 9,109,747 | B2 | 8/2015 | Schernthaner | |
| 2004/0112116 | A1 | 6/2004 | Dunning et al. | |
| 2004/0173033 | A1 * | 9/2004 | Gilbert | B61K 9/08 73/862 |
| 2005/0259273 | A1 * | 11/2005 | Mian | B61K 9/08 356/601 |
| 2008/0007724 | A1 * | 1/2008 | Chung | B61K 9/08 356/237.1 |
| 2008/0088856 | A1 | 4/2008 | Nishio | |
| 2009/0073428 | A1 * | 3/2009 | Magnus | B61K 9/08 356/237.1 |
| 2010/0128280 | A1 | 5/2010 | Davidson et al. | |
| 2013/0054172 | A1 | 2/2013 | Masuo et al. | |

FOREIGN PATENT DOCUMENTS

| | | |
|---|---|---|
| CN | 205718930 U | 11/2016 |
| JP | 2009168475 A | 7/2009 |
| TW | 496956 B | 8/2002 |
| TW | 523579 B | 3/2003 |
| TW | I234617 B | 6/2005 |
| TW | I474891 B | 3/2015 |
| TW | I553293 B | 10/2016 |
| TW | I621859 B | 4/2018 |
| WO | 2017/100296 A1 | 6/2017 |

OTHER PUBLICATIONS

Taiwanese Office Action for corresponding Application No. 106144350, dated Aug. 9, 2018.

* cited by examiner

MEASURING APPARATUS

TECHNICAL FIELD

The disclosure relates to a morphology measuring apparatus for measuring geometrical restraint surfaces of guiding rail parts of a slide rail.

BACKGROUND

A moving direction of a sliding block is restricted by geometrical restraint surfaces of guiding rail parts of a slide rail cooperated with rolling balls or needle rollers. The sizes of the guiding rail part, the rolling ball (or the needle roller), and guiding grooves of a sliding block are related to the pre-loading force and the overall smoothness. The conventional method is to perform a friction quality test after the slide rail is assembled by preparing a plurality of rolling balls (or needle rollers) in different size. If the result is nonqualified, the size would be modified or the rolling balls (or the needle roller) would be replaced with another size, and the friction test would be performed repeatedly until it is qualified. However, this might increase manufacturing complexity and increase the cost of material, time cost and workforce.

Other tests may include: using a coordinate-measuring machine, a profilometer or an optical type measurement device. However, the coordinate-measuring machine is too big in size, so it is not suitable for online testing. When a moving direction of a probe of the profilometer is perpendicular to a scanning direction, the probes would be stuck due to lateral force. The accuracy of the optical type measurement device is decreased by the influence of cutting oil and dust.

SUMMARY

Accordingly, the disclosure provides a measuring apparatus, configured to measure a plurality of surface profiles of a plurality of to-be-measured guiding rail parts of a slide rail, includes: a plurality of measuring probes fixed on a probe holding seat, the measuring probes disposed on the probe holding seat according to the surface profiles of to-be-measured guiding rail parts, and at least one moving device moves the probe holding seat along a cross-section of the to-be-measured guiding rail parts or the to-be-measured guiding rail parts, such that there is a relative displacement between the measuring probes and the to-be-measured guiding rail parts. Each of the measuring probes has a corresponding coordinate system which is different from that of another one of the measuring probes, the corresponding coordinate systems are calibrated to a same coordinate system through a standard workpiece, and the surface profiles of the to-be-measured guiding rail parts are measured with the reference to the same coordinate system.

The aforementioned summary and the following detailed description are set forth in order to provide a thorough understanding of the disclosed embodiment and provide a further explanations of claims of the disclosure.

DETAILED DESCRIPTION

Figure 1:
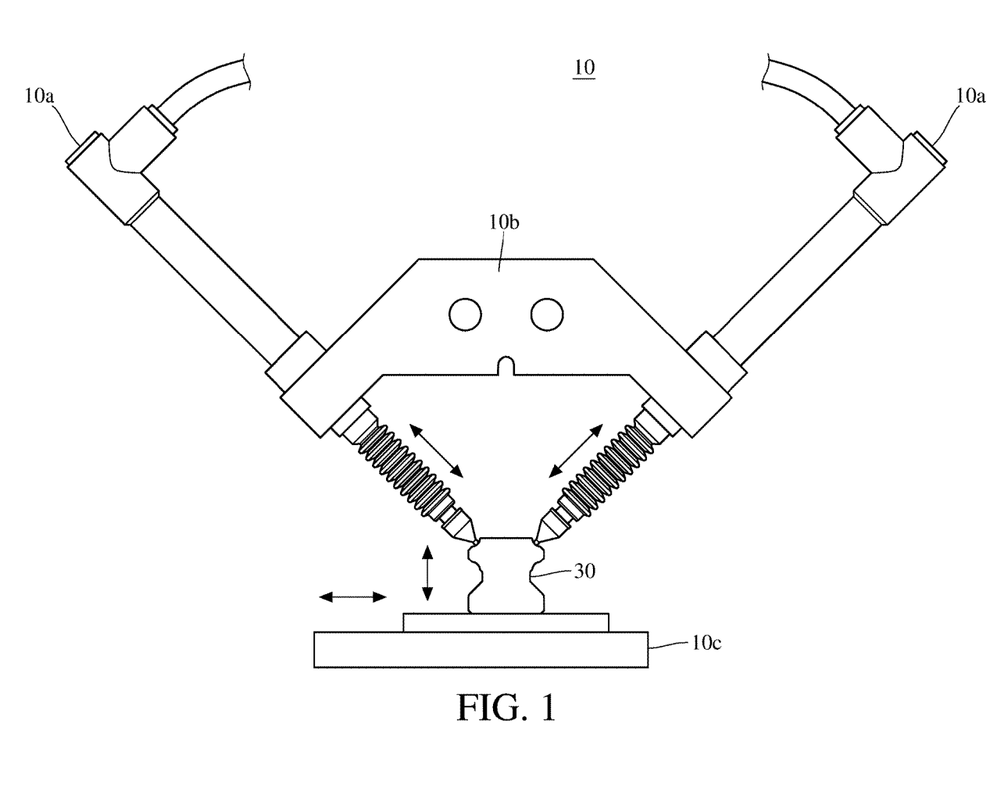
FIG. 1 is a schematic view of a measuring apparatus of one embodiment of the disclosure.

Please refer to FIG. 1A. This embodiment provides a measuring apparatus 10 configured to measure a plurality of the surface profiles of a plurality of to-be-measured guiding rail parts 30 of a slide rail. The measuring apparatus 10 includes a plurality of measuring probes 10a which is fixed on a probe holding seat 10b. In this embodiment, the measuring apparatus 10 includes two measuring probes 10a, but the present disclosure is not limit thereto. The measuring probes 10a are disposed on the probe holding seat 10b according to the surface profiles of the to-be-measured guiding rail parts. For example, the probe is turned to a direction parallel to the normal direction of the guiding rail part so as to decrease the influence of the lateral force, but it is not limited to be disposed in the normal direction.

Figure 5A:
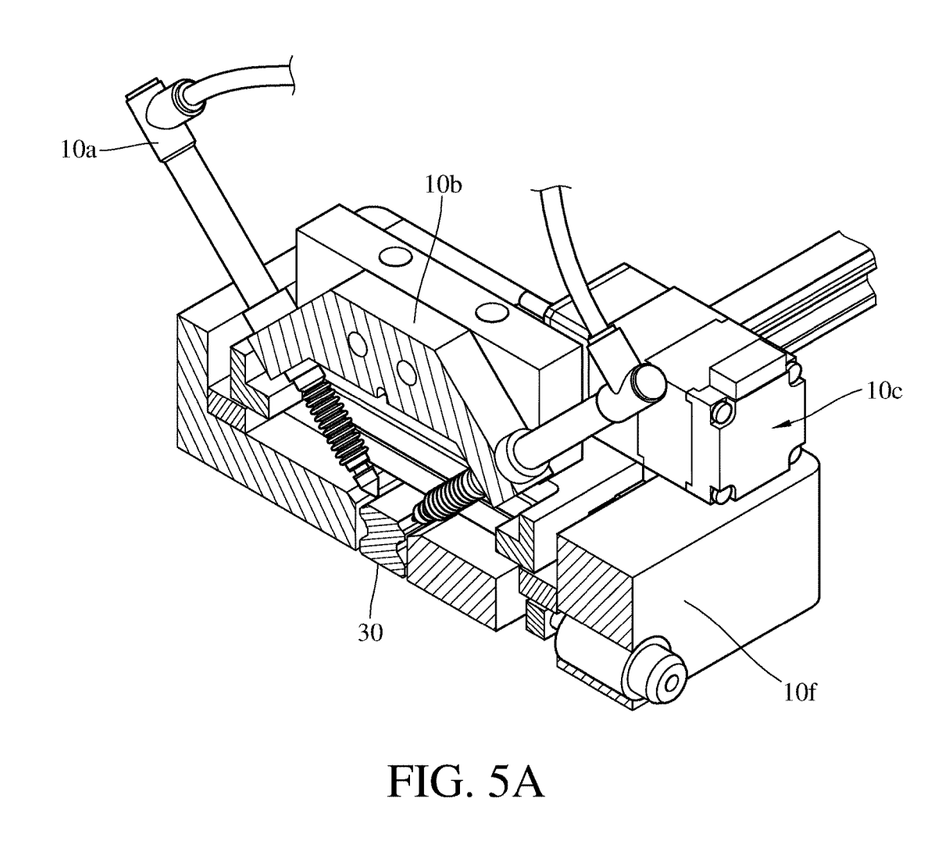
FIG. 5A illustrates a cross-sectional view of the measuring apparatus of the embodiment.

In this embodiment, the measuring apparatus 10 includes: at least one moving device 10c. The moving device 10c moves the probe holding seat 10b along a cross-section of the to-be-measured guiding rail parts or the to-be-measured guiding rail parts 30, such that there is a relative displacement between the measuring probe 10a and the to-be-measured guiding rail parts. The moving device 10c is configured to move the to-be-measured guiding rail parts 30 or move the measuring probes 10a. In a preferable embodiment, because the slide rail is long and heavy, it is not easy to be moved, thus the moving device 10c is configured to move the measuring probe 10a, as shown in FIG. 5A.

Figure 2A:
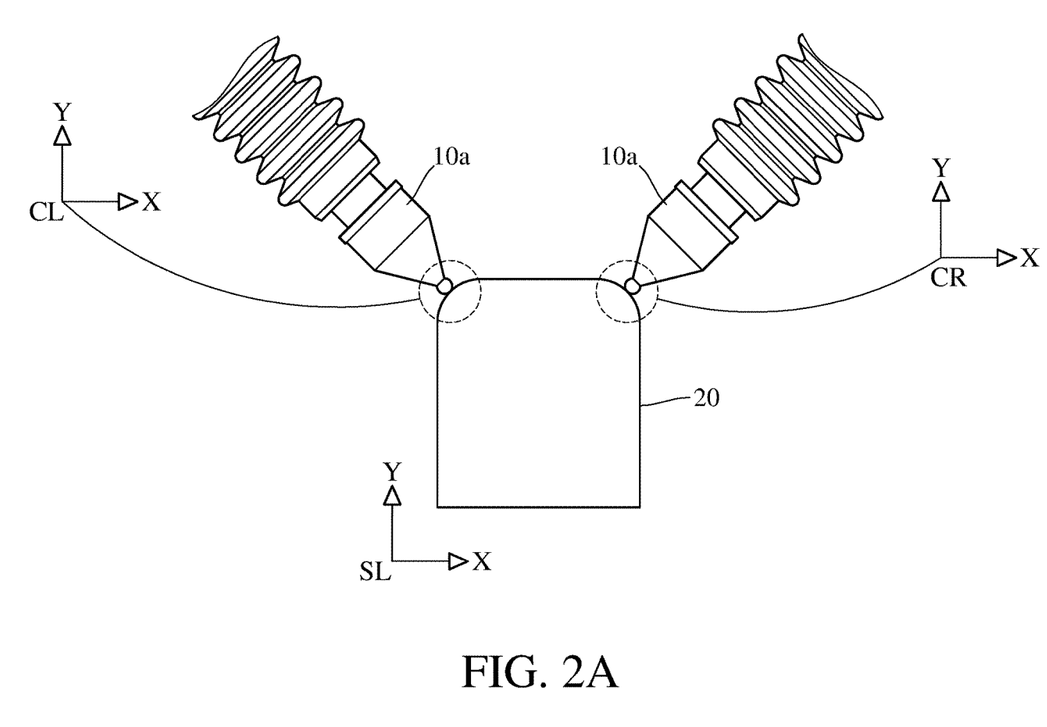
FIG. 2A and FIG. 2B show measuring principle used in the disclosure.
Figure 2B:
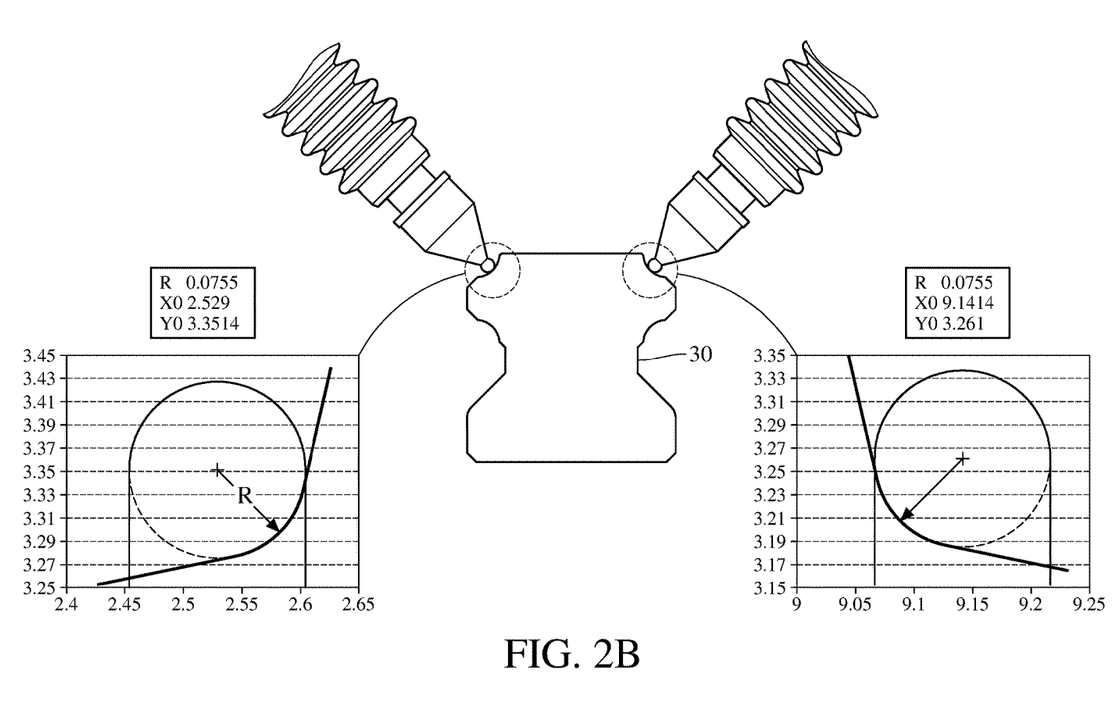

The measuring principle of this embodiment is discussed in bellow with the reference of FIG. 2A and FIG. 2B. In this embodiment, the measuring probes 10a are contact type linear displacement transducers. The contact type linear displacement transducer may be a magnetic grid transducer, an optical grid transducer, a capacitive grid transducer or a linear variable transformer. In some other embodiments, the measuring probes 10a may be optical measuring probes, pneumatic measuring probes, or electromagnetic measuring probes. The measuring probes 10a contact the surface of the to-be-measured guiding rail parts, and move along the to-be-measured guiding rail parts, such that the surface profiles of the to-be-measured guiding rail parts would cause the measuring probes moving back and forth. According to the level of the displacement of the measuring probes, the surface profiles of the slide rail are obtained. Each of the measuring probes 10a has a corresponding coordinate system, such as coordinate system CL or CR, which are different from each other. The corresponding coordinate systems require to be calibrated to a same coordinate system SL through a standard workpiece 20, and then the surface profiles of the to-be-measured guiding rail parts 30 would be measured with the reference to the same coordinate system SL. Please refer to FIG. 2B. The surface profiles of the slide rail measured by the measuring apparatus 10 can be fit by virtual circles, wherein the radius R and its center coordinate of the left side virtual circle are respectively 0.0755 and (2.529, 3.3514), and the radius R and its center coordinate of the right side virtual circle are respectively 0.0755 and (9.1414, 3.261). The pitch circle diameter of the side rail is obtained according to the distance between the centers of the virtual circles.

Figure 3A:
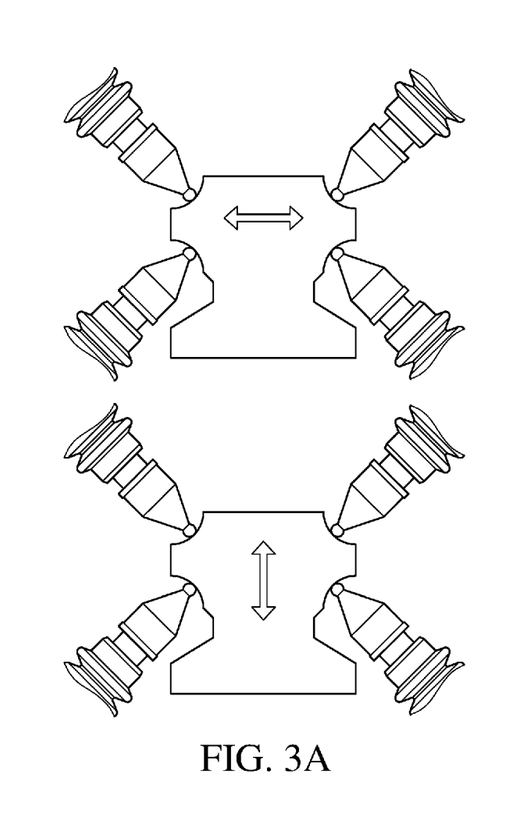
FIG. 3A and FIG. 3B show the other aspect of the relative displacement between measuring probes and a rolling ball type slide rail.
Figure 3B:
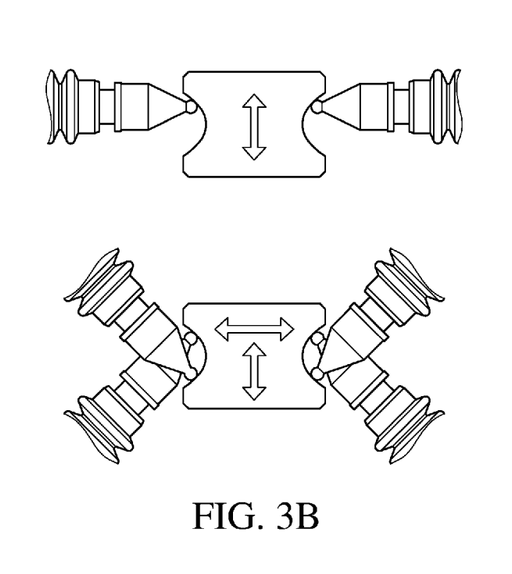

FIG. 3A, FIG. 3B, FIG. 3C and FIG. 3D are another type of this embodiment. FIG. 3A and FIG. 3B are schematic views showing measuring rolling ball type slide rail. FIG. 3A shows that the measuring apparatus configured to measure a slide rail having four rolling ball type rails (four sliding groove type slide rail), the measuring apparatus includes four measuring probes respectively perpendicular to tangent plane of the to-be-measured guiding rail part, and the moving device drives the measuring probes to move with respect to the cross-section of the slide rail in two axial directions perpendicular to each other. FIG. 3B shows a measuring apparatus that is configured to measure a slide rail having two rolling ball type rails (Gothic slide rail). The measuring apparatus includes two measuring probes or four measuring probes, wherein two of the measuring probes are respectively interlaced to the other two measuring probes. The moving device drives the measuring probes to move with respect to the cross-section of the slide rail in two axial directions perpendicular to each other.

Figures 3C, 3D:
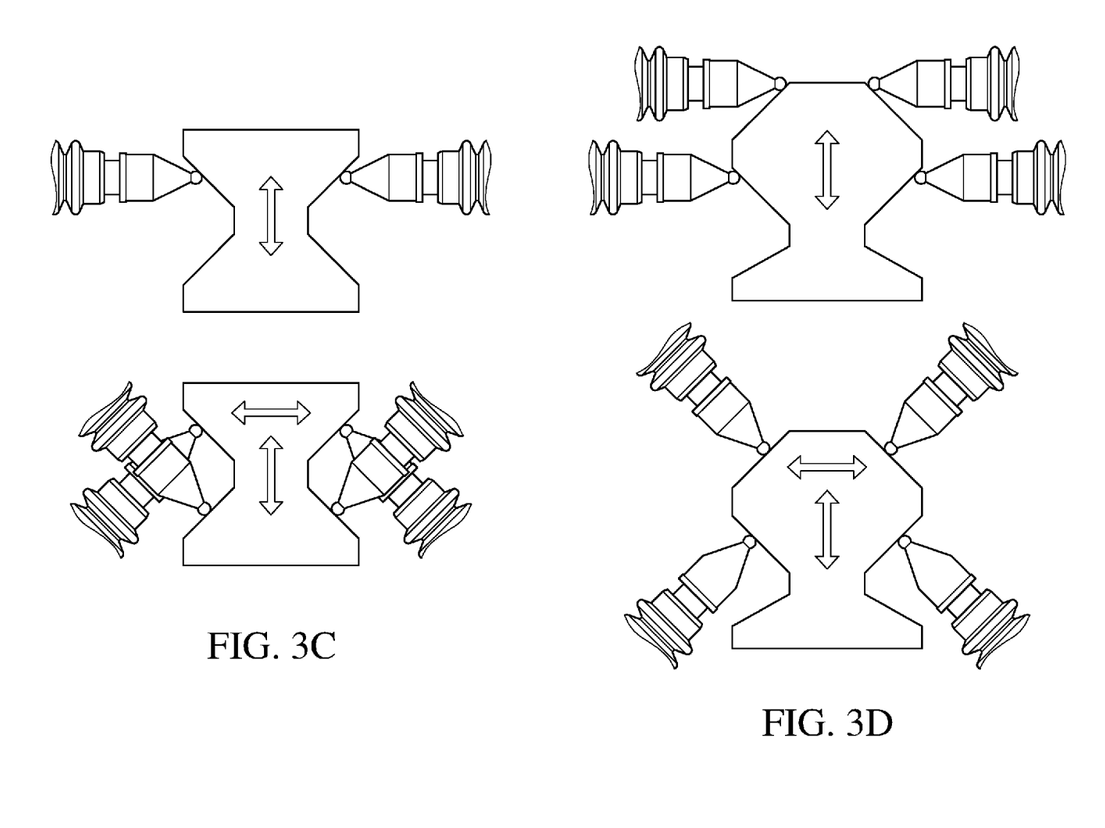
FIG. 3C and FIG. 3D show the other aspect of the relative displacement between measuring probes and a needle roller type slide rail.

FIG. 3C and FIG. 3D are schematic views showing measuring needle roller type slide rail of this embodiment. FIG. 3C shows a measuring apparatus that is configured to measure a slide rail having two needle roller type rails. The measuring apparatus includes two measuring probes or four measuring probes, wherein two of the measuring probes are respectively interlaced to the other two measuring probes, and the moving device drives the measuring probes to move with respect to the cross-section of the slide rail in two axial directions perpendicular to each other. FIG. 3D shows a measuring apparatus that is configured to measure the slide rail having four needle roller type rails. The measuring apparatus includes four measuring probes, and the moving device drives the measuring probes move with respect to the cross-section of the slide rail in two axial directions perpendicular to each other.

Figure 4A:
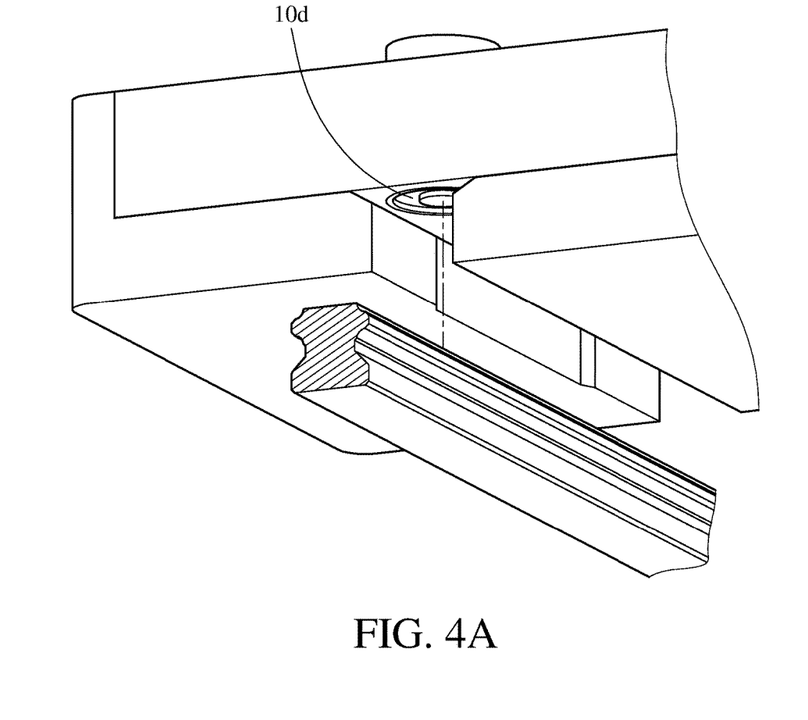
FIG. 4A illustrates an absorbing device of the embodiment.
Figure 4B:
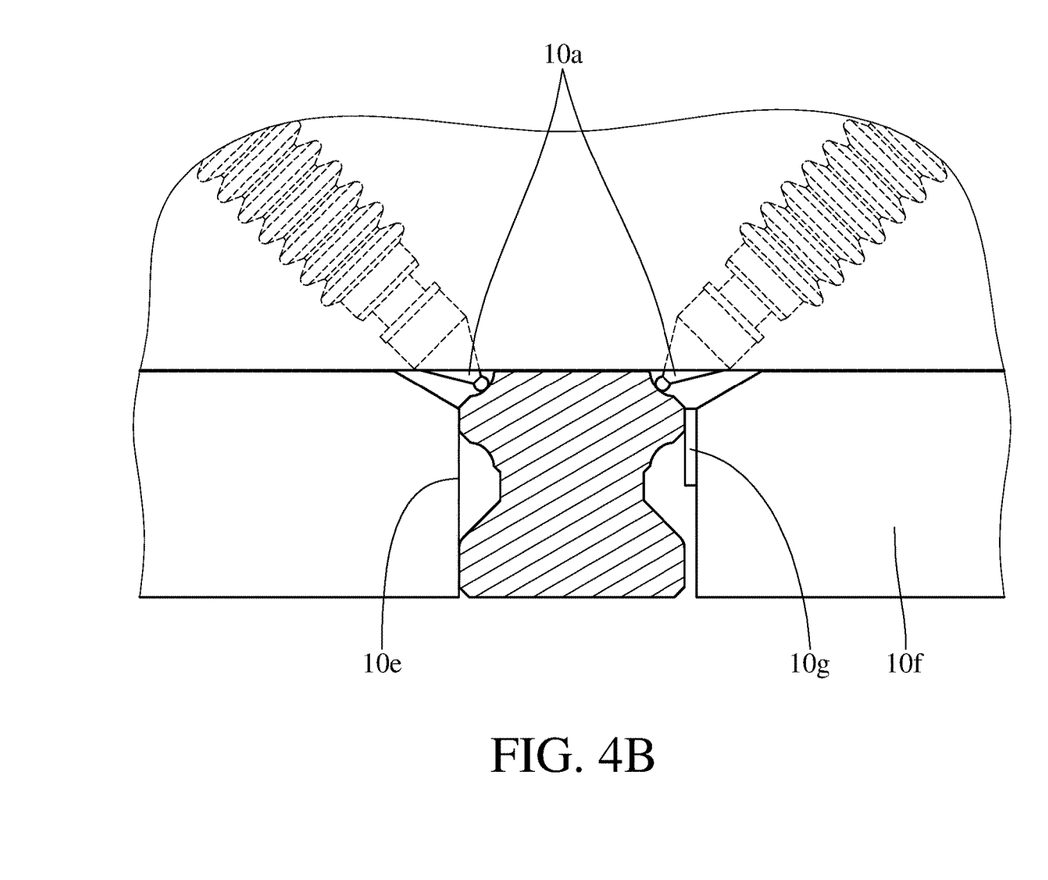
FIG. 4B illustrates a lateral leaning surface, a clamping surface and a lateral clamping member of the embodiment.

Please refer to FIG. 4A. The to-be-measured slide rail is taken as a fixing element so as to achieve a compact measuring apparatus. This embodiment further includes an absorbing device 10d, and the absorbing device 10d is a magnetic absorbing device or a pneumatic absorbing device. Please refer to FIG. 4B. This embodiment further includes a lateral leaning surface 10e and a lateral clamping member 10f. The measuring apparatus is lean on a side of the slide rail with the lateral leaning surface 10e; the lateral clamping member 10f clamps the other side of the slide rail with a clamping surface 10g.

Figure 5B:
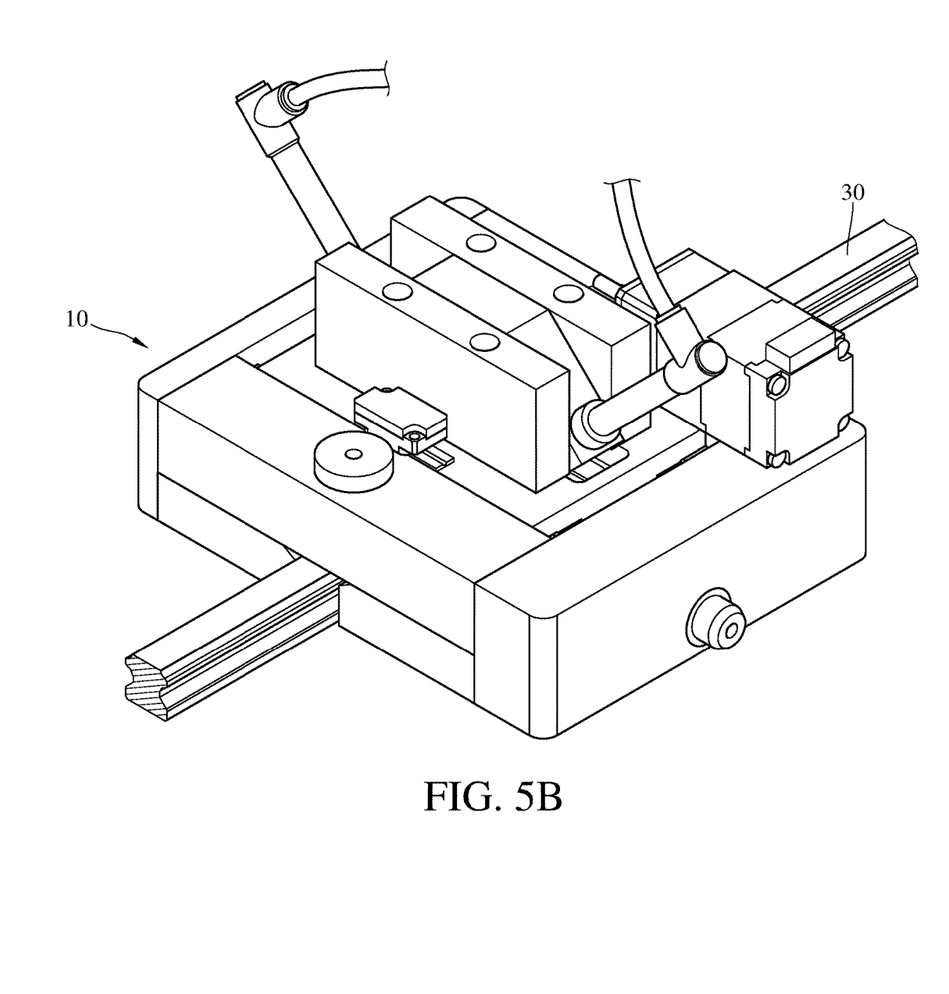
FIG. 5B illustrates a perspective view of the measuring apparatus and a slide rail of the embodiment.

FIG. 5A shows a cross-sectional view of the measuring apparatus of the embodiment. FIG. 5A shows the relative locations among the measuring probe 10a, the probe holding seat 10b, the moving device 10c, the lateral clamping member 10f and the to-be-measured guiding rail parts 30. The operation steps of the measuring apparatus may sequentially include: putting downward the measuring apparatus 10 on the slide rail, activating the absorbing device 10d and the lateral clamping member 10f, and extending the measuring probes 10a to begin to measure. FIG. 5B shows the measuring apparatus 10 and the to-be-measured guiding rail parts 30 of this embodiment.

It will be apparent to those skilled in the art that various modifications and variations can be made to the present disclosure. It is intended that the specification and examples be considered as exemplary embodiments only, with a scope of the disclosure being indicated by the following claims and their equivalents.

SIGN DESCRIPTION 10 measuring apparatus
10a measuring probe
10b probe holding seat
10c moving device
10d absorbing device
10e lateral leaning surface
10f lateral clamping member
10g clamping surface
20 standard workpiece
30 to-be-measured guiding rail part

What is claimed is:

1. A measuring apparatus, configured to measure a plurality of surface profiles of a plurality of to-be-measured guiding rail parts of a slide rail, comprising:
    a plurality of measuring probes fixed on a probe holding seat, and the plurality of measuring probes disposed on the probe holding seat according to the plurality of surface profiles of the plurality of to-be-measured guiding rail parts; and
    at least one moving device moving the probe holding seat along a cross-section of the plurality of to-be-measured guiding rail parts or the plurality of to-be-measured guiding rail parts, such that there is a relative displacement between the plurality of measuring probes and the plurality of to-be-measured guiding rail parts;
    wherein, each of the plurality of measuring probes has a corresponding coordinate system which is different from that of another one of the plurality of measuring probes, and the plurality of surface profiles of the plurality of to-be-measured guiding rail parts are measured by the plurality of measuring probes after the corresponding coordinate systems are calibrated to a same coordinate system through a standard workpiece.

2. The measuring apparatus according to claim 1, wherein the plurality of measuring probes are contact type linear displacement transducers.

3. The measuring apparatus according to claim 1, wherein the plurality of measuring probes are optical measuring probes, pneumatic measuring probes or electromagnetic measuring probes.

4. The measuring apparatus according to claim 1, further comprising:
    an absorbing device configured to absorb and fix the slide rail;
    a lateral leaning surface, the measuring apparatus leaning on a side of the slide rail with the lateral leaning surface; and
    a lateral clamping member configured to clamp the other side of the slide rail with a clamping surface.

5. The measuring apparatus according to claim 4, wherein the absorbing device is a magnetic absorbing device or a pneumatic absorbing device.

* * * * *